(12) United States Patent
Jakobsson

(10) Patent No.: US 10,360,351 B1
(45) Date of Patent: *Jul. 23, 2019

(54) AUTHENTICATION TRANSLATION

(71) Applicant: RightQuestion, LLC, Portola Valley, CA (US)

(72) Inventor: Bjorn Markus Jakobsson, Portola Valley, CA (US)

(73) Assignee: RightQuestion, LLC, Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,636

(22) Filed: Feb. 12, 2016

Related U.S. Application Data

(63) Continuation of application No. 13/706,254, filed on Dec. 5, 2012, now Pat. No. 9,294,452.

(60) Provisional application No. 61/569,112, filed on Dec. 9, 2011, provisional application No. 61/587,387, filed on Jan. 17, 2012.

(51) Int. Cl.
  *G06F 21/00* (2013.01)
  *G06F 21/10* (2013.01)
  *H04L 29/06* (2006.01)
  *G06F 21/12* (2013.01)

(52) U.S. Cl.
  CPC .......... *G06F 21/10* (2013.01); *G06F 21/121* (2013.01); *G06F 21/128* (2013.01); *H04L 63/083* (2013.01); *H04L 63/0861* (2013.01); *H04L 63/10* (2013.01); *H04L 63/20* (2013.01)

(58) Field of Classification Search
  None
  See application file for complete search history.

(56) References Cited

U.S. PATENT DOCUMENTS

| | | | |
|---|---|---|---|
| 6,016,476 A | 1/2000 | Maes | |
| 7,512,965 B1 * | 3/2009 | Amdur | H04L 63/20 726/1 |
| 7,950,051 B1 * | 5/2011 | Spitz | G06F 21/31 380/277 |
| 8,549,300 B1 * | 10/2013 | Kumar | H04L 9/3247 713/153 |
| 8,577,813 B2 | 11/2013 | Weiss | |
| 8,856,539 B2 | 10/2014 | Weiss | |
| 9,100,826 B2 | 8/2015 | Weiss | |
| 2004/0107170 A1 | 6/2004 | Labrou | |
| 2004/0236632 A1 | 11/2004 | Maritzen | |

(Continued)

FOREIGN PATENT DOCUMENTS

| WO | WO-2004051585 A2 | 6/2004 |
|---|---|---|
| WO | 2005001751 A1 | 1/2005 |

OTHER PUBLICATIONS

Hammer-Lahav, Ed. "The OAuth 1.0 Protocol", from https://tools.ietf.org/html/rfc5849, Apr. 2010.

*Primary Examiner* — Andrew J Steinle
(74) *Attorney, Agent, or Firm* — Van Pelt, Yi & James LLP

(57) ABSTRACT

Authentication translation is disclosed. A request to access a resource is received at an authentication translator, as is an authentication input. The authentication input corresponds to at least one stored record. The stored record is associated at least with the resource. In response to the receiving, a previously stored credential associated with the resource is accessed. The credential is provided to the resource.

32 Claims, 8 Drawing Sheets

(56) References Cited

U.S. PATENT DOCUMENTS

| | | | |
|---|---|---|---|
| 2005/0198348 A1* | 9/2005 | Yeates | H04L 12/6418 709/232 |
| 2009/0100269 A1* | 4/2009 | Naccache | H04L 9/3271 713/186 |
| 2010/0242102 A1* | 9/2010 | Cross | G06F 21/32 726/7 |
| 2011/0205016 A1* | 8/2011 | Al-Azem | H04L 63/0861 340/5.52 |
| 2011/0231651 A1* | 9/2011 | Bollay | H04L 63/166 713/152 |
| 2012/0110341 A1* | 5/2012 | Beigi | G06Q 20/3223 713/186 |
| 2012/0167193 A1* | 6/2012 | Gargaro | G06F 21/41 726/8 |

* cited by examiner

AUTHENTICATION TRANSLATION

CROSS REFERENCE TO OTHER APPLICATIONS

This application is a continuation of co-pending U.S. patent application Ser. No. 13/706,254, entitled AUTHENTICATION TRANSLATION filed Dec. 5, 2012 which is incorporated herein by reference for all purposes. U.S. patent application Ser. No. 13/706,254 claims priority to U.S. Provisional Patent Application No. 61/569,112 entitled BACKWARDS COMPATIBLE ROBUST COOKIES filed Dec. 9, 2011, and also claims priority to U.S. Provisional Patent Application No. 61/587,387 entitled BIOMETRICS-SUPPORTED SECURE AUTHENTICATION SYSTEM filed Jan. 17, 2012, both of which are incorporated herein by reference for all purposes.

BACKGROUND OF THE INVENTION

Providing credentials to a service, whether via a mobile or other device, is often a tedious experience for a user. Unfortunately, to make authentication easier for themselves, users will often engage in practices such as password re-use, and/or the selection of poor quality passwords, which render their credentials less secure against attacks. Accordingly, improvements in authentication techniques would be desirable. Further, it would be desirable for such improvements to be widely deployable, including on existing/legacy systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
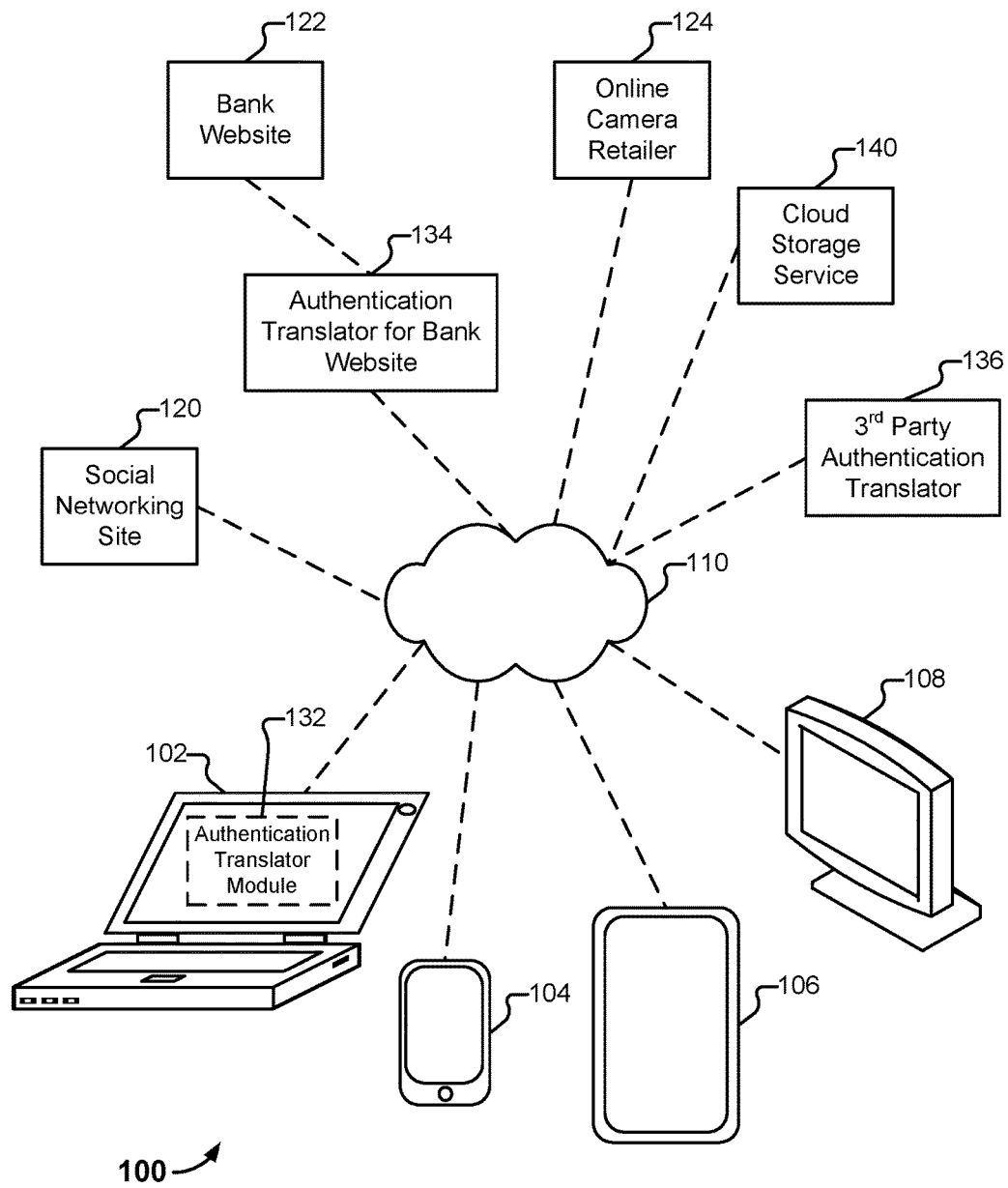
FIG. 1 illustrates an embodiment of an environment in which authentication translation is provided.

FIG. 1 illustrates an embodiment of an environment in which authentication translation is provided. In the example shown, a variety of client devices 102-108 connect, via one or more networks (represented as a single network cloud 110) to a variety of services 120-124 (also referred to herein as sites 120-124). In particular, client device 102 is a notebook computer owned by a user hereinafter referred to as Alice. Notebook 102 includes a camera, a microphone, and a fingerprint sensor. Client device 104 is a smartphone, also owned by Alice. Client device 104 includes a camera. Client device 106 is a tablet owned by Bob, and sometimes used by Bob's son Charlie. Client device 106 includes a camera and a fingerprint sensor. Client device 108 is a kiosk located in the lobby of a hotel. Kiosk 108 includes a camera and a microphone. The techniques described herein can be used with or adapted to be used with other devices, as applicable. For example, the techniques can be used in conjunction with gaming systems, with peripheral devices such as mice, and with embedded devices, such as door locks.

Service 120 is a social networking site. Service 122 is a website of a bank. Service 124 is the online store of a boutique camera retailer. Each of services 120-124 requires a username and password (and/or a cookie) from a user prior to giving that user access to protected content and/or other features. As will be described in more detail below, using the techniques described herein, users need not type such usernames and passwords into their devices whenever required by a service. Instead, users can authenticate themselves to an "authentication translator" via an appropriate technique, and the authentication translator will provide the appropriate credentials to the implicated service on the user's behalf. Also as will be described in more detail below, authentication translators can be located in a variety of places within an environment. For example, notebook computer 102 includes an authentication translator module 132 that provides authentication translation services. The other devices 104-108 can also include (but need not include) their own respective authentication translator modules. The owner of bank website 122 also operates an authentication translator 134 associated with the bank. Finally, authentication translator 136 provides authentication translation services to a variety of businesses, including online camera retailer 124.

Figure 2:
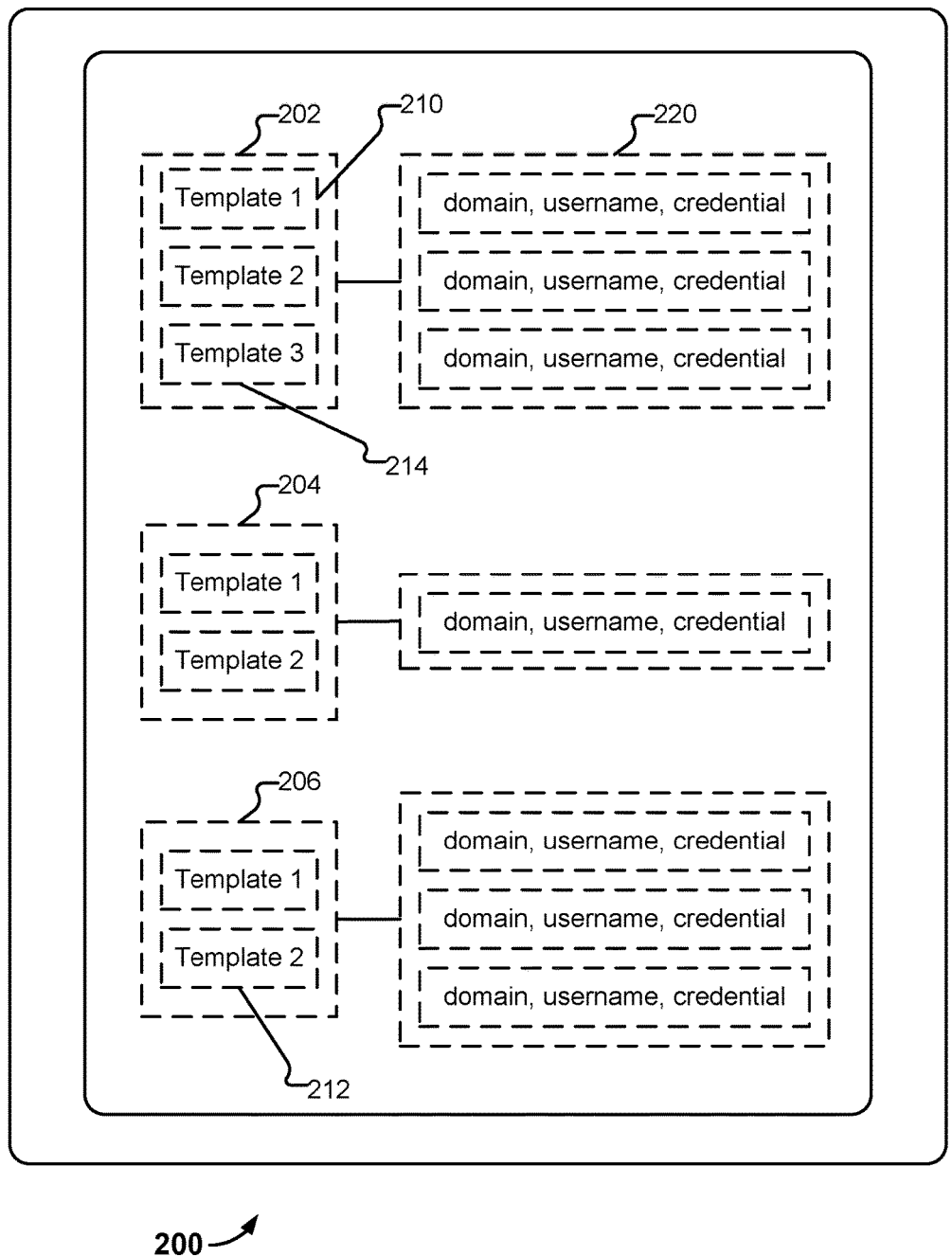
FIG. 2 illustrates an embodiment of credential information stored on a device.

FIG. 2 illustrates an embodiment of credential information stored on a device. In particular, device 200 stores three user profiles 202-206, each of which contains a username and one or more templates (e.g., template 210) associated with the user. In various embodiments, a template is a collection of biometric features. Using fingerprints as an example type of biometric, a corresponding template includes a collection of patterns, minutia, and/or other features that can be matched against to determine if a person's fingerprint matches the fingerprint of the registered user (i.e., the owner of a given user profile). A representation of a single fingerprint may be included in multiple templates (e.g., in different resolutions, in accordance with different protocols, as captured during warm vs. cold conditions, and/or by itself or in combination with multiple fingerprints). When other biometrics are employed (e.g., facial recognition, voiceprint, or retina scan technology), features appropriate to those types of biometrics are included in the template. Other types of features can also be included in templates. As one example, a user's typing speed and/or accuracy can be measured by a device, such as device 102, and used to distinguish between multiple users of a device. For example, suppose Alice types at 100 words per minute and rarely makes mistakes. A representation of this information can be stored in template 212. Also suppose Alice's niece, who sometimes uses Alice's laptop computer when visiting Alice types at 20 words per minute and makes many mistakes. In some embodiments, the fact that a user was recently (e.g., within the last 5 minutes) typing on laptop 102 at 90 words per minute is evidence of a match against template 212. In this case, the typing speed of 90 words per minute is similar enough to Alice's typical behavior, it is considered a match. Various policies can be included in a profile that govern how matches are to be performed. For example, policies can specify thresholds/tolerances for what constitutes a match, and can specify that different levels of matches can result in different levels of access to different resources.

A profile is associated with a vault (e.g., vault 220). The vault, in turn, contains triples specifying a service provider/domain, a username, and a credential. The vault can also contain other sensitive user information, such as account numbers, address/phone number information, and health care data. The credential for a service provider/domain can be a password (e.g., for legacy servers), and can also take alternate forms (e.g., a cryptographic key for service providers supporting stronger authentication methods).

In some embodiments, profiles, templates, and vaults (collectively "authentication information") are stored entirely in an unprotected storage area, and are stored in the clear. In other embodiments, secure storage techniques are used to secure at least a portion of the authentication information.

Figure 3:
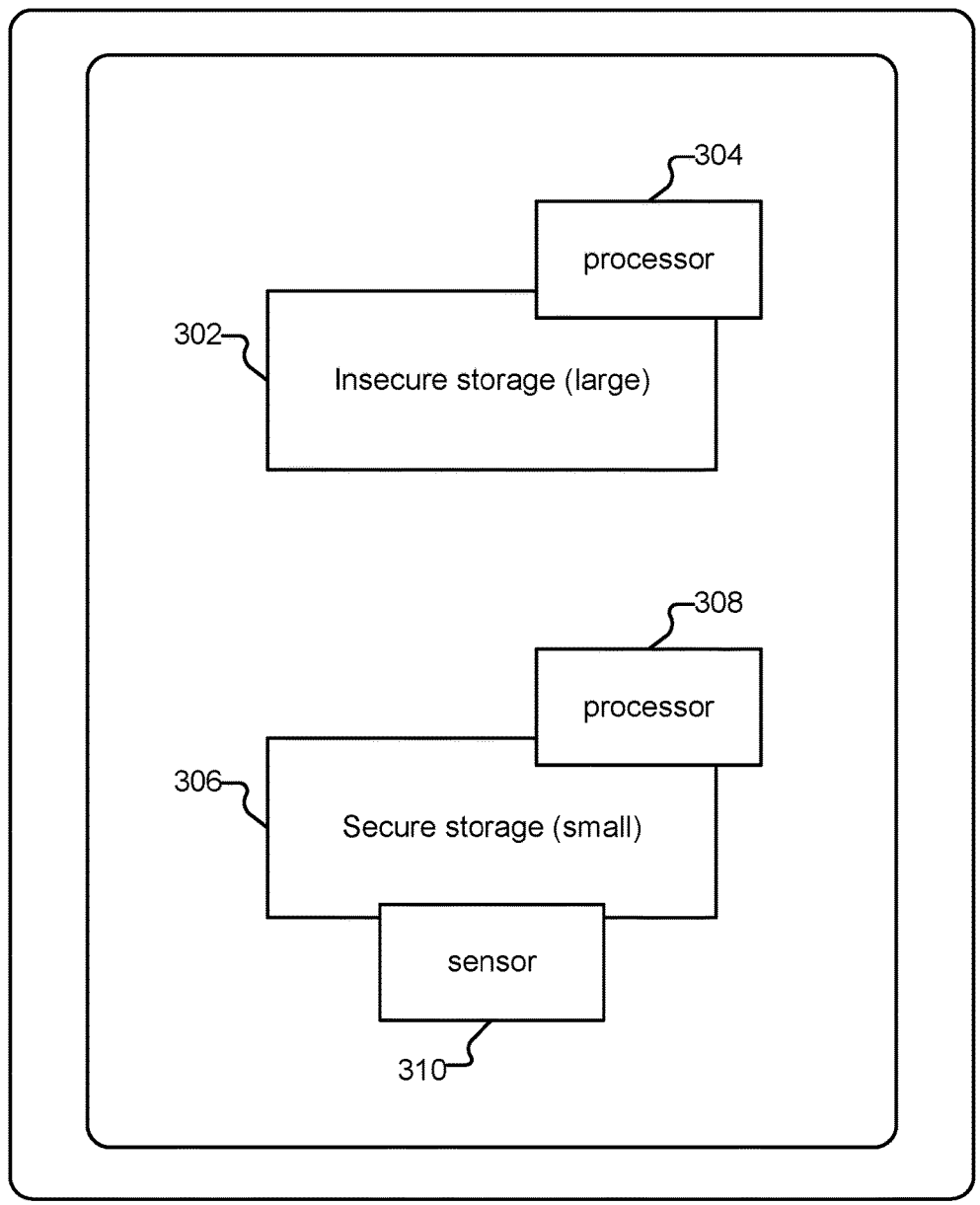
FIG. 3 illustrates an embodiment of a device with secure storage.

One example of a device with secure storage is illustrated in FIG. 3. In the example shown, a mobile phone 300 includes a large and insecure storage 302 attached to a fast processor 304, and a smaller but secure storage 306 attached to a dedicated processor 308 and a sensor 310 (e.g., a camera or a fingerprint reader). Users (and applications) can read from and write to the insecure storage area. However, users cannot access the secure storage area, and the fast processor can only communicate with the dedicated processor/sensor via a restricted API. As another example, a unique decryption key associated with a given vault can be stored in a profile. The vault is an encrypted and authenticated container that can be stored on insecure storage, e.g., on the device, and also backed up (e.g., to a cloud storage service 140 or to an alternate form of external storage). As needed, authentication information or portions thereof can be loaded into secure storage and decrypted. For example, one can use AES to encrypt the files one by one, using a key stored on the secured storage. A message authentication technique, such as HMAC, can be used for authenticating the encrypted files to provide tamper prevention. Profiles and vaults can be updated while in secure storage; if this occurs, they are encrypted and MACed before being written back to the insecure storage, which may in turn propagate them to external backup storage. In yet other embodiments, profiles and vaults are stored entirely in secure storage, in plaintext, which allows them to be both read and written—and in particular, searched.

Example Transaction Types

A variety of transaction types can take place in the environment shown in FIG. 1, examples of which are discussed in this section.

Initial Registration

In order to begin using the techniques described herein, users perform some form of initial registration. As one example, suppose Alice launches an enrollment program installed on laptop 102. She uses the program to capture various biometric information (e.g., fingerprints, photographs of her face, etc.). A user profile is created for Alice, and the biometric information captured about her is encoded into a plurality of templates, such as templates 210 and 214. In some embodiments, Alice is also explicitly asked to supply credential information for services she would like to use, such as by providing the domain name of social networking site 120, along with her username and password for site 120. In other embodiments, domain/username/credential information is at least passively captured on Alice's behalf and included in one or more vaults such as vault 220. Credential information can also be important from a browser password manager already in use by Alice or other appropriate source. In some embodiments, Alice also registers with cloud storage service 140, which will allow her to back up her authentication information and to synchronize it across her devices (e.g., 102 and 104), as described in more detail below.

Other registration approaches can also be used. For example, registration can be integrated into the experience the first time a device is used. Thus, when Bob first turns on tablet 106, he may be prompted to take a picture of his face (with a profile/templates being created in response). Similarly, the first time Charlie uses tablet 106, the techniques described herein can be used to determine that Charlie does not yet have a profile (e.g., because none of the templates already present on tablet 106 match his biometrics) and Charlie can be prompted to enroll as a second user of the device.

Authentication

Suppose Alice wishes to authenticate to banking website 122. Using a fingerprint reader incorporated into her laptop, she performs a fingerprint scan, which causes her biometric features to be extracted and compared to any stored templates residing on her computer. If a match is found, an associated decryption key is selected, and the associated vault is loaded and decrypted. The vault is scanned for an entry that matches the selected service provider (i.e., website 122). If a matching entry is found, the associated domain, username, and site credential are extracted from the vault. In some embodiments, the validity of the domain name mapping is verified at this point to harden the system against domain name poisoning. Next, a secure connection is established between Alice's computer and the service provider, and Alice is authenticated. For service providers supporting strong user authentication, mutual SSL can be used, for example. A variety of policies can be involved when performing matching. For example, to access certain domains, Alice's print may need only match template 210. To access other domains, Alice may need to match multiple templates (e.g., both 210 and 214). As another example, in order to access social networking site 120, Alice may merely need to be sitting in front of her computer, which has an integrated webcam. Even in relatively low light conditions, a match can be performed against Alice's face and features stored in a template. However, in order to access bank website 122, Alice may need a high quality photograph (i.e., requiring her to turn on a bright light) and may need to demonstrate liveness (e.g., by blinking or turning her head). As yet another example, other contextual information can be included in policies. For example, if Alice's IP address indicates she is in a country that she is not usually in, she may be required to match multiple templates (or match a template with more/better quality features) in order to access retailer 124, as distinguished from when her IP address indicates she is at home.

In some embodiments, the biometric sensor used by a user may be a peripheral device (e.g., a mouse with an integrated fingerprint scanner that is connected to the user's primary device via USB). In such scenarios, the peripheral device may be responsible for storing at least a portion of authentication information and may perform at least some of the authentication tasks previously described as having been performed by Alice's computer. For example, instead of processors 304 and 308, and storages 302 and 306 being collocated on a single device (e.g., laptop 102), processor 304 and storage 302 may be present on a primary device, and processor 308 and storage 306 may be present on a peripheral device (e.g., that also includes a sensor, such as a fingerprint reader).

In such scenarios, once Alice's login to banking website 122 is successfully completed, the secure session can be handed over from the peripheral device to the primary device, in a way that does not allow the primary device retroactive access to the plaintext data of the transcripts exchanged between the peripheral device and the service provider. One way this can be accomplished is by renegotiating SSL keys between the peripheral device and the website, after which the newly negotiated key can be handed off from the peripheral device to the primary device. This avoids retroactive credential capture in a setting where the device is infected by malware.

Figure 4:
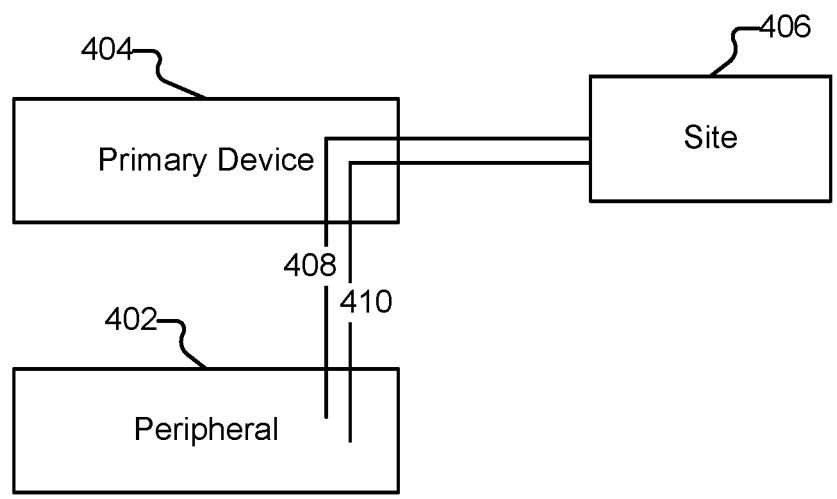
FIG. 4 illustrates an example of a renegotiation.

An example of renegotiation is depicted in FIG. 4. Specifically, after a user has successfully authenticated to a fingerprint reader, a login is performed to a service provider. Using the primary device (404) as a proxy, the peripheral fingerprint reader 402 negotiates a first SSL connection (408) with a service provider 406, over which credentials are exchanged. The proxy then renegotiates SSL (410), which replaces the old key with a new one. The new key is disclosed to the device, which then seamlessly takes over the connection with the service provider and performs the transaction protected by the authentication. The credentials exchanged during the first SSL connection cannot be accessed by device 404, since the key of the renegotiated session is independent of the key of the original session; this provides protection against malware residing on the device. Renegotiation can be used when the primary device 404 is believed to be in a safe state when performing the negotiation of the SSL connection, but it is not known whether it is in a safe state during the transaction protected by the authentication. Renegotiation can also be used when a secure component of the primary device 404 performs the negotiation of the SSL connection and another and potentially insecure component of the primary device 404 is involved in the transaction protected by the authentication.

Figure 5:
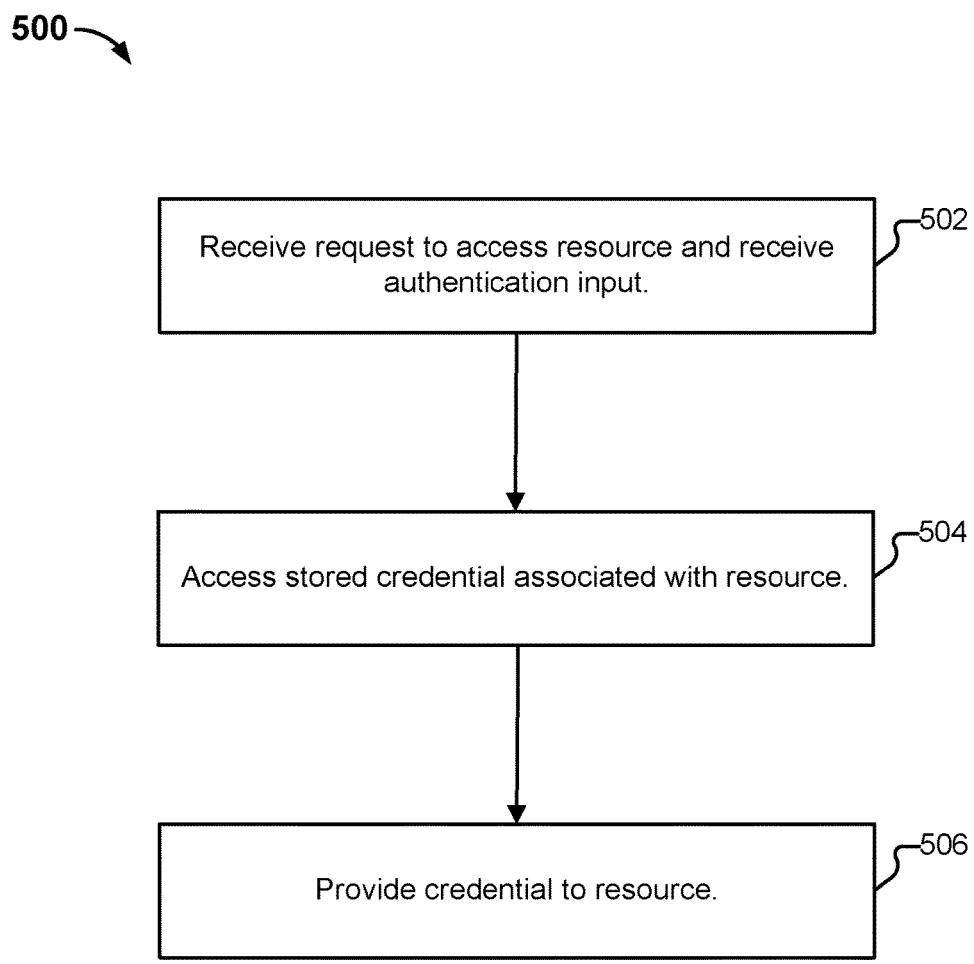
FIG. 5 illustrates an embodiment of a process for performing authentication translation.

FIG. 5 illustrates an embodiment of a process for performing authentication translation. The process begins at 502 when a request to access a resource is received, as is an authentication input. One example of the processing performed at 502 is as follows. Suppose Alice wishes to sign into social networking website 120. She directs a web browser application installed on client 102 to the social networking website. Authentication translator module 132 recognizes, from the context of Alice's actions (e.g., that she is attempting to access site 120 with her browser) that she would like to access a particular resource. Authentication translator module 132 prompts Alice (e.g., by a popup message or via a sound) to provide biometric information (e.g., to use the integrated fingerprint reader on her laptop). In some embodiments, the translator module does not prompt Alice, for example, because Alice has been trained to provide biometric information automatically when attempting to access certain resources. In yet other embodiments, the translator module only prompts Alice if she fails to provide acceptable biometric information within a timeout period (e.g., 30 seconds).

Module 132 compares Alice's supplied biometric data to the templates stored on her computer. If a suitable match is found, and if an entry for site 120 is present in the applicable vault, at 504, a previously stored credential associated with the resource is accessed. In particular, the username and password for the website, as stored in a vault, such as vault 220, are retrieved from the vault.

Finally, at 506, the credential is provided to the resource. For example, Alice's username and password for site 120 are transmitted to site 120 at 506. The credential can be transmitted directly (e.g., by the module or by Alice's computer) and can also be supplied indirectly (e.g., through the use of one or more proxies, routers, or other intermediaries, as applicable).

Other devices can also make use of process 500 or portions thereof. For example, when Alice launches a banking application on phone 104, implicit in her opening that application is her desire to access the resources of website 134. The application can take Alice's picture and compare it to stored templates/vault information. If an appropriate match is found, a credential can be retrieved from the vault on her phone (or, e.g., retrieved from cloud storage service 140) and provided to website 134.

As another example, suppose Charlie is using tablet 106 and attempts to visit site 120, whether via a dedicated application or via a web browser application installed on the tablet. Charlie's photograph is taken, and then compared against the profiles stored on tablet 106 (e.g., both Bob and Charlie's profiles). When a determination is made that Charlie's photograph matches a template stored in his stored profile (and not, e.g., Bob's), Charlie's credentials for site 120 are retrieved from a vault and transmitted by an authentication translator module residing on client 106.

As yet another example, kiosk 108 can be configured to provide certain local resources (e.g., by displaying a company directory or floor plan on demand) when users speak certain requests into a microphone. Enrolled users (e.g., with stored voiceprint or facial recognition features) can be granted access to additional/otherwise restricted services in accordance with the techniques described herein and process 500.

New Device

In some embodiments, to register a new device, a user provides an identifier, such as a username or an account number to the device. The new device connects to an external storage (such as cloud storage 140), provides the user identifier and credential, and downloads the user's templates/vaults from the service. In some embodiments, the templates/vaults are encrypted. Once downloaded, the template is decrypted and stored in a secure storage area, while the still encrypted vault can be stored in insecure storage. The decryption key can be generated from information the user has/knows, or from biometric data—such as features extracted from fingerprinting of all ten fingers. In some embodiments, more arduous fingerprinting is required for the setup of a new device than for regular authentication to avoid that a new device gets registered by a user thinking she is merely authenticating—or worse still, simply touching the device. Moreover, it translates into higher entropy of the decryption keys.

Backup Authentication

Backup authentication allows a user, such as Alice, to access resources in the event she is unable to or unwilling to interact with a particular biometric sensor. As one example, instead of having a single template associated with her profile, Alice can have multiple templates associated with it, e.g., where the first template includes fingerprint features and the second template includes voice biometric, facial recognition, or iris detection features. As a second example, where the service Alice is connecting to is a legacy website (i.e., one that users authenticate to using usernames and passwords), such a service would allow the use of passwords and password reset mechanisms by Alice without requiring Alice to use a fingerprint reader.

In various embodiments, environment 100 supports the ability of users (e.g., under duress) to release the contents of their vaults. For example, if Alice was physically threatened with the loss of a finger by a criminal, Alice could instead release the contents of her vault(s)—the ultimate goal of the criminal. As one example, in the event Alice supplies all 10 fingerprints to the sensor, provides a special password, or supplies a fingerprint and a second identifier, a cleartext version of her vault(s) could be made available.

Access Policies

In various embodiments, cloud storage service 140 is configured to accept backups from multiple devices associated with a single account, and synchronize the updates so that all devices get automatically refreshed. For example, Alice's laptop 102 and phone 104 could both communicate with cloud storage service 140 which would keep their authentication information synchronized. Refreshes can also be made in accordance with user-configured restrictions. For example, Alice's employer could prevent privileged employer data from being stored on shared personal devices, or on any device that was not issued by the employer. As another example, arbitrary policies can be defined regarding the access to and synchronization of software and data, and to tie a license or access rights to a person (and her fingerprint) rather than to a device. As yet another example, in some embodiments (e.g., where a device is made publicly available or otherwise shared by many users), no or a reduced amount of authentication information resides on a device, and at least a portion of authentication information is always retrieved from cloud storage service 140.

Remote Wiping

Remote wiping of a user's authentication information (e.g., templates) can be used both to "unshare" previously shared devices (e.g., where Bob and Charlie both have user profiles on their shared tablet 106), and to avoid that criminals with physical component access to lost devices gain access to templates and vault contents. In some embodiments, polices such as ones where a template self-wipes if it is not matched within a particular duration of time are supported. Since user data can be frequently backed up to the cloud storage, and recovered from this using the new device registration process, inconvenience to the user will be minimized.

Legacy Server Support

New authentication schemes typically require changes to a significant codebase residing with service providers. If the code is well written and documented, such changes may be relatively simple. Commonly, though, this may not be so. The engineers who originally wrote the code of relevance may have long since left the company; the code they left behind may be poorly documented—if documented at all. In severe cases, the legacy code may have been written in an outdated programming language or written in a way that does not follow guidelines for good code. This makes updates to the codebase impractical or virtually impossible in many common cases. Even if none of these challenges complicate the desired modifications, it is commonly a great bureaucratic burden to obtain permission to make modifications (e.g., to store an extra field in a backend database), because every affected part of the organization may need to review the request.

As will be described in the following section, the technologies described herein can be used in conjunction with legacy servers (e.g., existing servers that rely on usernames and passwords to authenticate users), and in particular, can be used without requiring modification to such legacy servers.

Cookies

Cookies are commonly used by legacy servers for user authentication. Unfortunately, cookies have several problems. For one thing, they are sometimes deleted—whether explicitly/intentionally by the end user or by the user's software. In addition, cookies are commonly stolen. Approaches such as cache cookies and identification using user agents can be more resistant to these problems, however, they have their own problems. For example, their use requires new code and new fields in the credential database stored by the server.

In some embodiments, authentication translators, such as translators 134 and 136 (also referred to herein as proxies) provide authentication translation services on behalf of associated services. Translators 134 and 136 are illustrated as single logical devices in FIG. 1. In some embodiments, the translators comprise standard commercially available server hardware (e.g., a multi-core processor, 4+ Gigabytes of RAM, and one or more Gigabit network interface adapters) and run typical server-class operating systems (e.g., Linux). Translators 134 and 136 can also be implemented using a scalable, elastic architecture and may comprise several distributed components, including components provided by one or more third parties. For example, translators 134 and 136 may store user credential information or may task cloud storage service 140 with storing at least a portion of that information.

In the case of authentication translator 134, service is provided with respect to bank website 122 only. Authentication translator 134 is positioned between a legacy web server (122) and the Internet (110)—and therefore between the legacy server and any client devices. Authentication translator 134 is configured to translate traffic between the legacy server and client devices so that the client devices (and respective users) perceive the new authentication mechanism, while the legacy server remains unchanged. Authentication translator 136 works similarly, but it provides authentication translation as a third party service to multiple providers, an example of which is online camera retailer 124.

Authentication translators 134 and 136 can also perform process 500. For example, when a device transmits a request to access website 122, the request is intercepted by translator 134, as is cookie/user agent information. The received information can be used to determine a username/password associated with the device, and that information can be passed by translator 134 to website 122 on behalf of the device.

Figure 6:
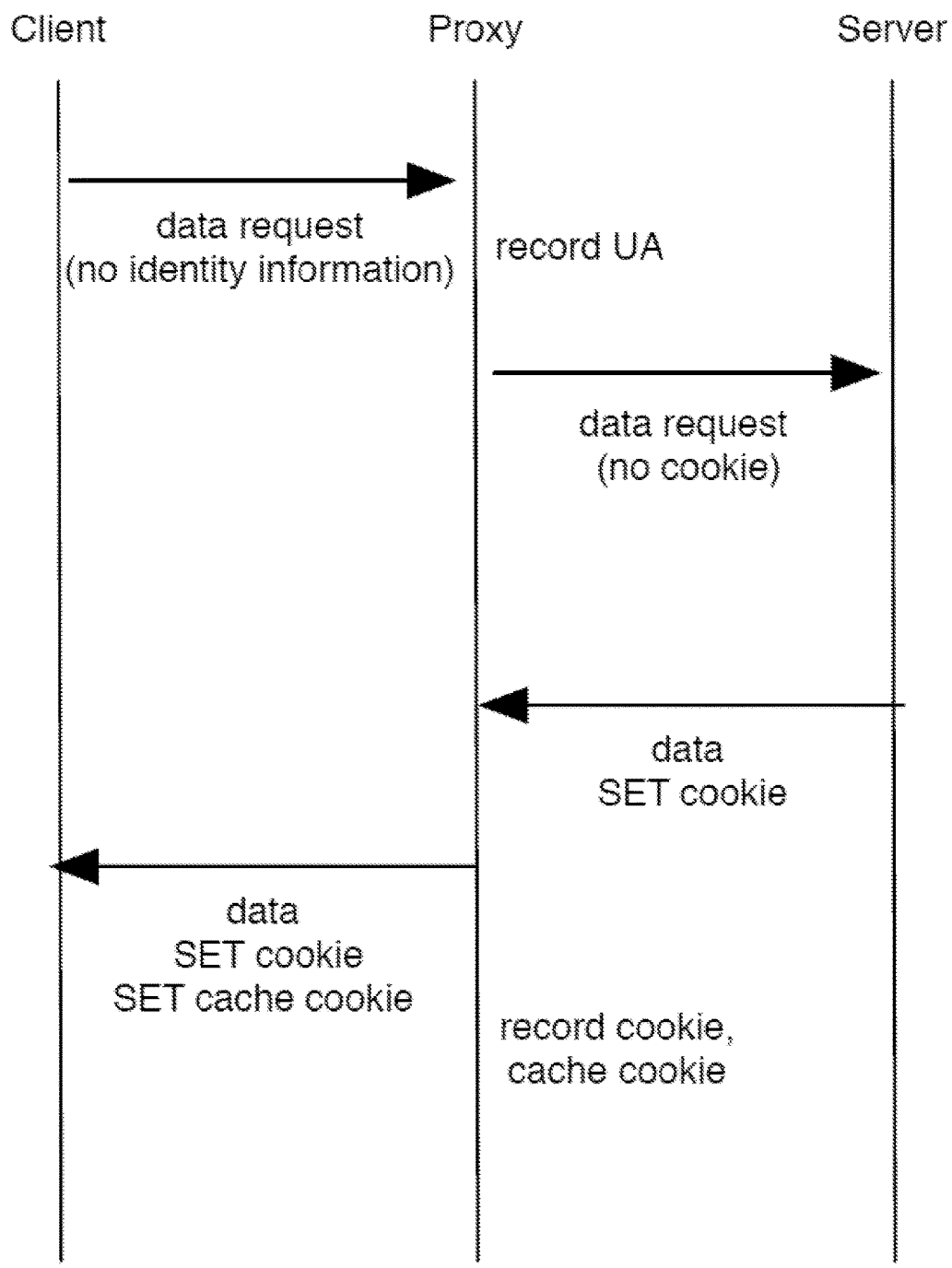
FIG. 6 illustrates an example of what occurs when a client device first visits the site of a legacy server via an authentication translator.

FIG. 6 illustrates an example of what occurs when a client device first visits the site of a legacy server via an authentication translator. The translator (referred to in the figure as a "proxy") fails to identify the client, and passes on the request to the legacy server. The legacy server responds to the request and sets a cookie. The proxy passes on the response, including the cookie and also a cache cookie. The proxy stores the information about both these types of identifiers, along with the user agent of the client device. This triplet of information is also referred to herein as an identifier.

Figure 7:
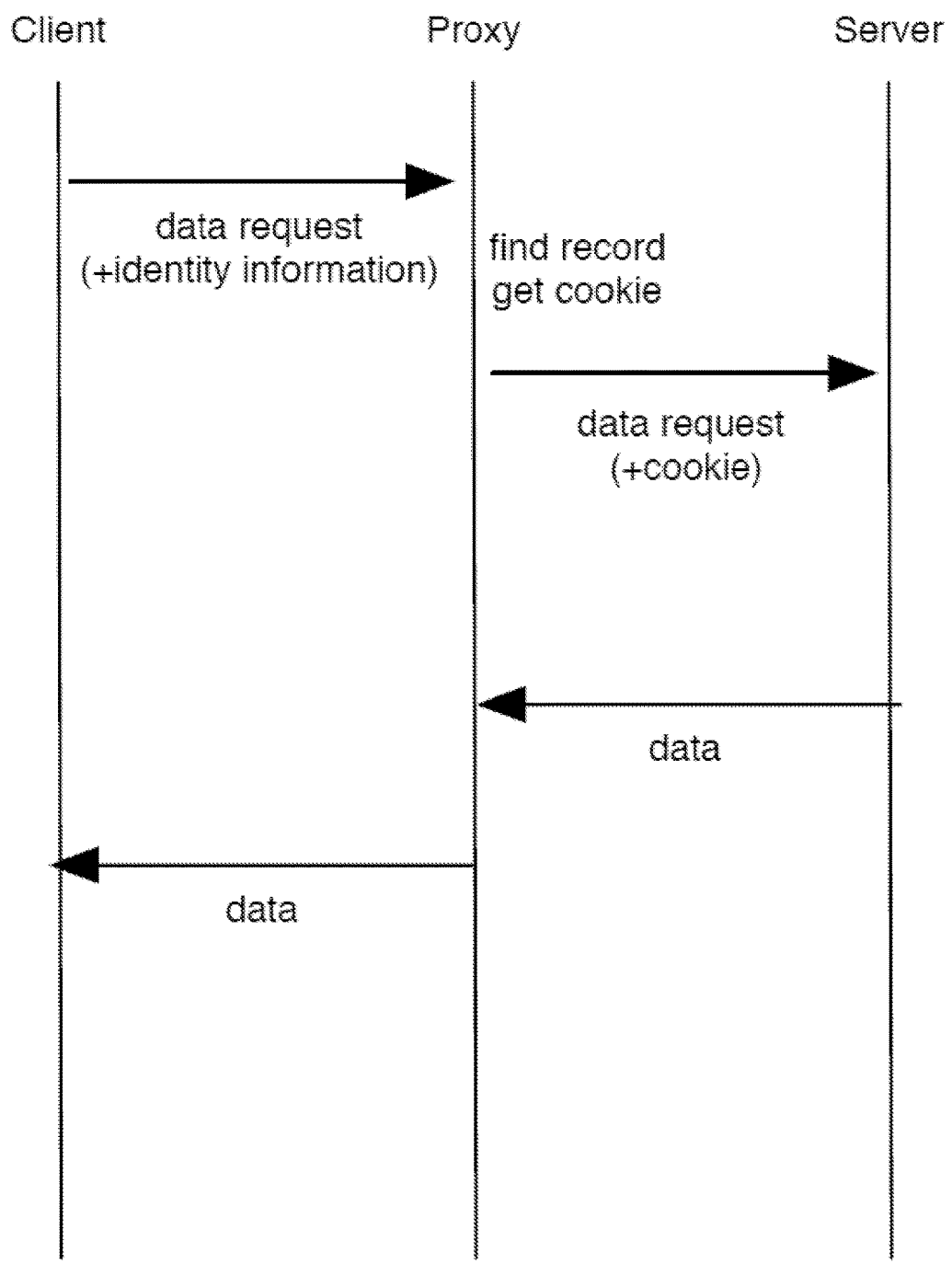
FIG. 7 illustrates an example of what occurs when a device subsequently visits the site of a legacy server via an authentication translator.

FIG. 7 illustrates an example of what occurs when a device subsequently visits the site of a legacy server via an authentication translator. In this scenario, the device's request is accompanied by some form of identifying information. The proxy uses this information to identify the associated cookie and passes this along to the legacy server, along with the request. In some embodiments, additional processing is also involved. For example, reading a cache cookie may require user interaction. Moreover, if not all of the identifying information is present in the request, the proxy can be configured to set the missing information again by sending a corresponding request to the client device.

The translation of cache cookies and user agent information to cookies involves a two-way translation. First, when the legacy server sets a cookie, the proxy will set the two types of cookies—both an HTML cookie and a cache cookie—and then create a new record in which the two cookies are stored, along with the user agent information of the client device. The user agent information can include quite a bit of data associated with a browser—such as the browser type and version, the clock skew, and the fonts that are installed. While each of these pieces of information only contributes a small amount of entropy, the collection of items can be sufficient to identify the device in most cases. Moreover, while some of these types of data may change over time—in fact, all of them may—they do not typically change, and when one or two of them do, the others typically do not. When the client device is used to visit a site controlled by the legacy server, the cookie, cache cookie and user agent information are read (if available), the record identified, and the request translated and sent to the legacy server. When a legacy server requests that the user password is updated (e.g., as part of an annual or other periodic requirement), the transmission of this request to the user can be suppressed—in which case the database of the proxy is updated to create the illusion of an update. The user can be involved in authentication as needed, e.g., if, in addition to supplying a credential, a user must also solve a CAPTCHA, the CAPTCHA can be displayed to the user (with the user's credentials being handled in accordance with the techniques described herein).

Figure 8:
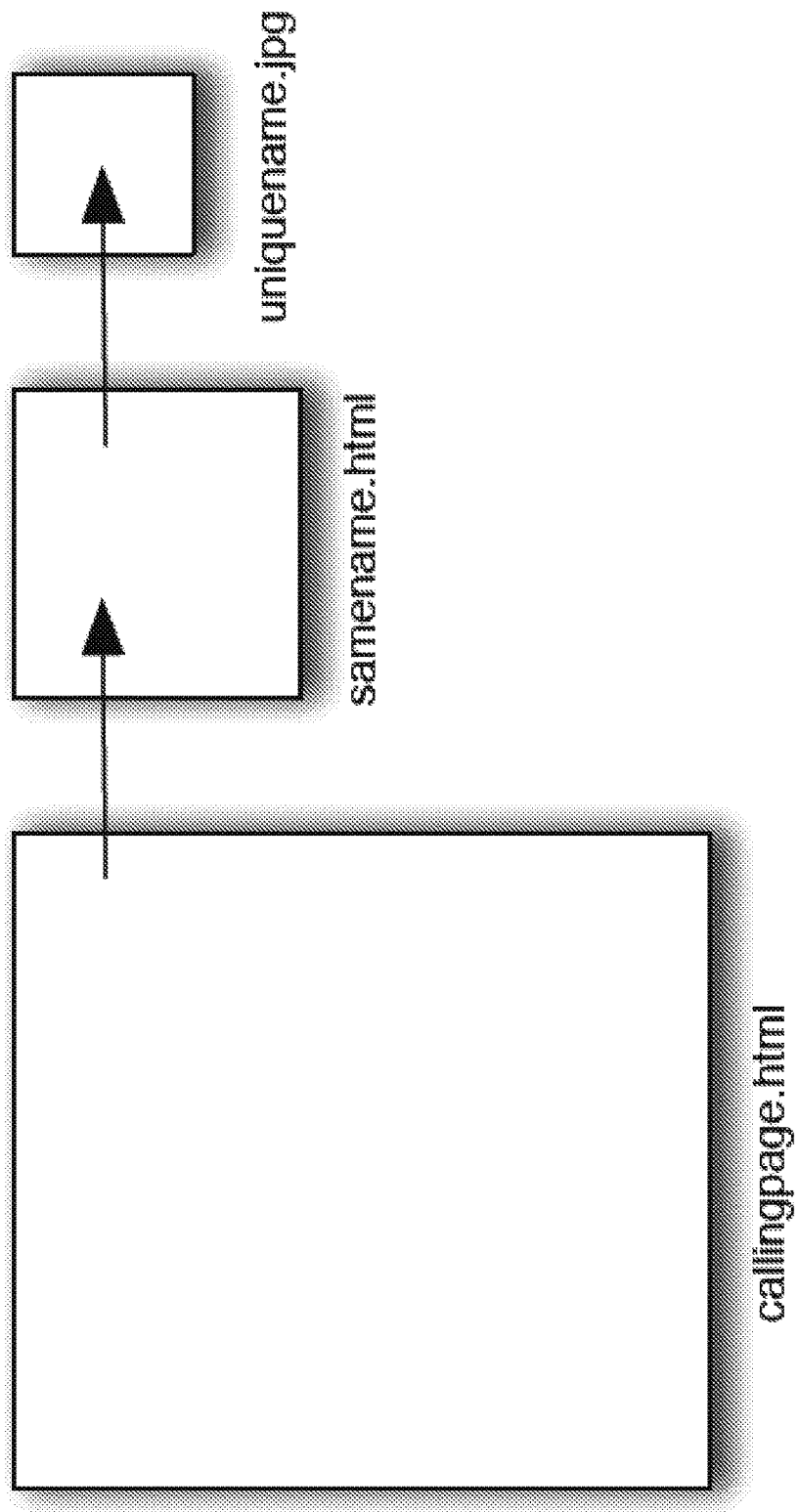
FIG. 8 shows the structure of an example of a cache cookie used in some embodiments.

FIG. 8 shows the structure of an example of a cache cookie used in some embodiments. Cache cookies can be associated with a particular webpage, just like an HTML cookie can. In the example shown in FIG. 8, the proxy wishes to associate a page "calling page.html" with a cache cookie. It embeds a request for a second object, "samename.html" in callingpage.html for every visitor. However, as the cache cookie is set for one visitor, a customized samename.html is served to this visitor. The page samename.html refers to an object with a different name for each user; that object is referred to as "uniquename.jpg." The cache cookie is set by embedding the request for samename.html in callingpage.html. The client browser attempts to render this, causing a request for samename.html from the server. The server configures samename.html to refer to a uniquely named file uniquename.jpg, and serves samename.html to the client. For the client browser to render samename.html, it requests the file uniquename.jpg, which is intentionally not served. That concludes the setting of a cache cookie. As a user returns to the page callingname.html, the browser again attempts to render the entire page, which causes it to load the object samename.html from its cache. As that is rendered, the client browser requests uniquename.jpg, which is not in its cache (since it was not served previously). The server still does not serve it, but takes note of the name of the file being requested, as it identifies the client device. Note that samename.html can be displayed in a zero-sized iframe, which makes the end user unaware of it being rendered.

A cache cookie is an implementation of the typical cookie functionality that uses the client device's browser cache. Unlike user agents, it does not change over time, and like standard HTML cookies, it cannot be read by a party other than that which set it. However, like HTML cookies, it could be deleted—by the user clearing his or her browser cache. Cache cookies are not automatically transmitted with GET requests, unless the cache elements are embedded in the referring pages. This adds a potential round of communication in some settings. By relying on user agent information, cache cookies, and HTML cookies to identify the client device, it is much more likely that a machine will be recognized than if only HTML cookies are used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive, at an authentication translator at a device, an authentication input and an indication of a request, by a user of the device, to access a resource external to the device;
in response to determining, by the authentication translator at the device, a match using the received authentication input, obtain access to a record stored on the device, wherein the record is associated at least with the external resource;
retrieve, from the stored record accessed at least in part by determining, by the authentication translator at the device, the match using the received authentication input, a previously stored credential associated with the external resource, wherein the previously stored credential is different from the received authentication input, and wherein the previously stored credential retrieved from the record stored on the device comprises at least one of a cryptographic key and a cookie;

establish a connection between the device and the external resource to which the user requested access; and facilitate a login of the user to the external resource at least in part by transmitting, on behalf of the user, from the device and via the established connection, output based at least in part on the at least one of the cryptographic key and the cookie retrieved from the record accessed at least in part by determining, by the authentication translator at the device, the matching using the received authentication input, wherein the user of the device is logged into the external resource based at least in part on the output transmitted from the device on behalf of the user; and a memory coupled to the one or more processors and configured to provide the one or more processors with instructions.

2. The system of claim 1 wherein the authentication input is received in response to a user-supplied biometric input matching a template.

3. The system of claim 1 wherein the device further includes a biometric input component.

4. The system of claim 1 wherein the one or more processors are further configured to facilitate a session renegotiation.

5. The system of claim 1 wherein the one or more processors are further configured to receive, from a remote system, an encrypted container that includes at least one template containing biometric features.

6. The system of claim 1 wherein the authentication input comprises user agent information.

7. The system of claim 1 wherein the one or more processors are further configured to receive a password change request from the external resource and wherein the one or more processors are configured to update the previously stored credential without user input.

8. The system of claim 1 wherein access to another stored record associated with another resource is obtained using a different authentication input.

9. The system of claim 1 wherein the authentication input comprises a biometric input, and wherein access to the record stored on the device including the previously stored credential associated with the external resource is obtained at least in part by determining a match using the biometric input.

10. The system of claim 1 wherein the authentication translator at the device is associated with a plurality of records stored on the device, wherein the plurality of records comprise previously stored credentials associated with a plurality of external resources, and wherein the accessed record is included in the plurality of records.

11. The system of claim 1 further comprising a secure storage and an insecure storage, wherein the record is stored in the insecure storage, and wherein obtaining access to the record comprises loading the record to the secure storage.

12. The system of claim 11 wherein the record stored in the insecure storage is encrypted, and wherein obtaining access to the record further comprises decrypting the record loaded to the secure storage.

13. The system of claim 4 wherein the established connection via which the output was transmitted is associated with a first session, and wherein facilitating the session renegotiation comprises replacing a first key associated with the first session with a second key associated with a renegotiated session.

14. The system of claim 1 wherein the record stored on the device further comprises at least one of a username, a password, an account number, address information, phone information, and health care data.

15. The system of claim 1 wherein the match is determined at least in part by using at least one of a password and a template, the template comprising at least one of a fingerprint feature, a voice biometric feature, a facial recognition feature, an iris detection feature, and a retina scan feature.

16. The system of claim 1, wherein the one or more processors are further configured to:

encrypt and authenticate at least a portion of the record; and perform a backup of the encrypted and authenticated record to a remote storage entity, wherein the remote storage entity is configured to synchronize records between at least two devices associated with the user.

17. A method, comprising:

receiving, at an authentication translator at a device, an authentication input and an indication of a request, by a user of the device, to access a resource external to the device;

in response to determining, by the authentication translator at the device, a match using the received authentication input, obtaining access to a record stored on the device, wherein the record is associated at least with the external resource;

retrieving, from the stored record accessed at least in part by determining, by the authentication translator at the device, the match using the received authentication input, a previously stored credential associated with the external resource, wherein the previously stored credential is different from the received authentication input, and wherein the previously stored credential retrieved from the record stored on the device comprises at least one of a cryptographic key and a cookie;

establishing, using one or more processors, a connection between the device and the external resource to which the user requested access; and facilitating a login of the user to the external resource at least in part by transmitting, on behalf of the user, from the device and via the established connection, output based at least in part on the at least one of the cryptographic key and the cookie retrieved from the record accessed at least in part by determining, by the authentication translator at the device, the match using the received authentication input, wherein the user of the device is logged into the external resource based at least in part on the output transmitted from the device on behalf of the user.

18. The method of claim 17 further comprising facilitating a session renegotiation.

19. The method of claim 17 further comprising receiving, from a remote system, an encrypted container that includes at least one template containing biometric features.

20. The method of claim 17 further comprising receiving a password change request from the external resource and updating the previously stored credential without user input.

21. The method of claim 17 wherein access to another stored record associated with another resource is obtained using a different authentication input.

22. The method of claim 17 wherein the authentication input is received in response to a user-supplied biometric input matching a template.

23. The method of claim 17 wherein the device further includes a biometric input component.

24. The method of claim 17 wherein the authentication input comprises user agent information.

25. The method of claim 17 wherein the authentication input comprises a biometric input, and wherein access to the record stored on the device including the previously stored credential associated with the external resource is obtained at least in part by determining a match using the biometric input.

26. The method of claim 17 wherein the authentication translator at the device is associated with a plurality of records stored on the device, wherein the plurality of records comprise previously stored credentials associated with a plurality of external resources, and wherein the accessed record is included in the plurality of records.

27. The method of claim 17 wherein the record is stored in an insecure storage, and wherein obtaining access to the record comprises loading the record to a secure storage.

28. The method of claim 27 wherein the record stored in the insecure storage is encrypted, and wherein obtaining access to the record further comprises decrypting the record loaded to the secure storage.

29. The method of claim 18 wherein the established connection via which the output was transmitted is associated with a first session, and wherein facilitating the session renegotiation comprises replacing a first key associated with the first session with a second key associated with a renegotiated session.

30. The method of claim 17 wherein the record stored on the device further comprises at least one of a username, a password, an account number, address information, phone information, and health care data.

31. The method of claim 17 wherein the match is determined at least in part by using at least one of a password and a template, the template comprising at least one of a fingerprint feature, a voice biometric feature, a facial recognition feature, an iris detection feature, and a retina scan feature.

32. The method of claim 17, further comprising:
encrypt and authenticate at least a portion of the record; and
perform a backup of the encrypted and authenticated record to a remote storage entity, wherein the remote storage entity is configured to synchronize records between at least two devices associated with the user.

* * * * *